United States Patent [19]

Corrigan et al.

[11] Patent Number: 5,385,962
[45] Date of Patent: Jan. 31, 1995

[54] PHOTODEGRADATION-RESISTANT ELECTRODEPOSITABLE PRIMER COMPOSITIONS CONTAINING HINDERING AMINOETHER LIGHT STABILIZERS

[75] Inventors: Victor G. Corrigan, North Olmstead; Gerald W. Gruber, Westlake; Michael A. Polack, Medina, all of Ohio; Robert R. Zwack, Allison Park, Pa.

[73] Assignee: PPG Industries, Inc., Pittsburgh, Pa.

[21] Appl. No.: 93,572

[22] Filed: Jul. 19, 1993

Related U.S. Application Data

[60] Division of Ser. No. 745,797, Aug. 16, 1991, Pat. No. 5,260,135, which is a continuation-in-part of Ser. No. 736,199, Jul. 26, 1991, abandoned.

[51] Int. Cl.$^6$ .............................................. C08L 63/00
[52] U.S. Cl. ..................... 523/414; 523/415; 523/420; 528/118; 528/45
[58] Field of Search ............... 523/414, 415, 420; 528/45, 118

[56] References Cited

U.S. PATENT DOCUMENTS

| | | | |
|---|---|---|---|
| 3,799,854 | 3/1974 | Jerabek | 204/181 |
| 4,031,050 | 6/1977 | Jerabek | 523/415 |
| 4,294,741 | 10/1981 | Bosso | 260/29.6 NR |
| 4,297,261 | 10/1981 | Jozwiak, Jr. | 260/29.7 RP |
| 4,451,597 | 5/1984 | Victorius | 524/39 |
| 4,477,519 | 10/1984 | Frye | 428/331 |
| 4,524,192 | 6/1985 | Alexander et al. | 525/440 |
| 4,576,980 | 3/1986 | Dai et al. | 525/523 |
| 4,612,098 | 9/1986 | Dai et al. | 204/181.7 |
| 4,615,940 | 10/1986 | Panush et al. | 428/324 |
| 4,756,975 | 7/1988 | Fujii et al. | 428/461 |
| 4,812,337 | 3/1989 | Sugimura et al. | 427/407.1 |
| 4,981,759 | 1/1991 | Nakatani et al. | 428/626 |
| 5,106,651 | 4/1992 | Tyger et al. | 427/54.1 |
| 5,112,890 | 5/1992 | Behrens et al. | 524/102 |

FOREIGN PATENT DOCUMENTS 62-236873 10/1987 Japan .

*Primary Examiner*—Frederick Krass
*Attorney, Agent, or Firm*—William J. Uhl

[57] ABSTRACT

An electrodepositable primer composition having improved delamination resistance with regard to automotive topcoats is disclosed. The composition is particularly useful in conjunction with topcoats which transmit ultraviolet radiation. The composition includes an ionic resin and a hindered amine light stabilizer (HALS) which is preferably a hindered aminoether light stabilizer. A preferred hindered aminoether light stabilizer is bis-(1-octyloxy-2,2,6,6-tetramethyl-4-piperidinyl)sebacate. The invention also includes a process for coating a substrate by applying the above-described primer composition and subsequently applying a topcoat. The process can alternatively include applying a standard primer composition to a substrate and subsequently applying a HALS compound to the electrodeposited substrate.

8 Claims, No Drawings

PHOTODEGRADATION-RESISTANT ELECTRODEPOSITABLE PRIMER COMPOSITIONS CONTAINING HINDERING AMINOETHER LIGHT STABILIZERS

This is a division of application Ser. No. 07/745,797, filed Aug. 16, 1991, now U.S. Pat. No. 5,260,135 which is a continuation-in-part of application Ser. No. 07/736,199, now abandoned filed Jul. 26, 1991.

FIELD OF THE INVENTION

This invention relates to an electrodepositable primer composition. More particularly, this composition is well suited for reducing or eliminating delamination between topcoats and primer coats as a result of photodegradation of primer compositions.

BACKGROUND OF THE INVENTION

Electrodepositable primer coating compositions, particularly in the automotive industry, are typically corrosion resistant epoxy-based compositions and are typically crosslinked with aromatic isocyanates. If exposed to sunlight, such compositions undergo photodegradation from ultraviolet light. In some automotive applications, a spray applied primer surfacer is applied to the electrocoat before topcoating to provide protection from photodegradation. In other automotive applications, topcoats are applied directly to the electrocoat and in these instances, the topcoat usually prevents UV radiation from reaching the primer surface. However, if a topcoat does not provide sufficient protection, extensive photodegradation of the electrocoat can result in a loose powdery surface being formed on the primer. In such a case, delamination between the primer coat and the topcoat results from the formation of the loose powdery layer.

Typically, if a topcoat is sufficiently opaque to UV light by being filled with pigment and/or light-absorbing compounds, no ultraviolet light penetrates to the surface of epoxy-based primers to cause photodegradation. However, in the case of a thin topcoat and/or a topcoat which is not UV light absorbing, ultraviolet light can pass through the topcoat and cause photodegradation of an epoxy-based primer. The photodegradation results in delamination of the topcoat from the primer coat which produces catastrophic failure of the coating system. This problem is particularly likely to occur when a topcoat is lightly pigmented with metal flake pigments which tend to allow radiation to pass through to the primer.

Typically, the best way to avoid photodegradation of primer coatings is by formulating topcoats to prevent transmission of ultraviolet light to the primer surface. For example, the use of thick topcoats or opaque topcoats is sufficient. Also, the use of components in the topcoat to prevent transmission of ultraviolet light, such as ultraviolet light absorbers, is a successful strategy for avoiding photodegradation of the primer. However, reliance on proper formulation of topcoats can be unsatisfactory in the painting operation because of variations in the quality of topcoats. Accordingly, there is a need for a primer composition which retards photodegradation and subsequent delamination independent of the quality of the topcoat.

Other factors can aggravate the photosensitivity of an epoxy-based primer and can contribute to delamination of a topcoat from a primer coat, such as use of aromatic isocyanate crosslinkers or of $TiO_2$ as a pigment in electrodeposition coatings. Additionally, overbake of the electrodepositable coating at excessive times or temperatures or baking in an oxidizing atmosphere can aggravate the problem.

SUMMARY OF THE INVENTION

The present composition is directed toward an electrodepositable film-forming primer composition which includes an ionic resin and a hindered aminoether light stabilizer. In a preferred embodiment, the hindered aminoether light stabilizer is bis-(1-octyloxy-2,2,6,6-tetramethyl-4-piperidinyl) sebacate. In a further preferred embodiment of the composition, the composition also includes ultraviolet light absorbers and/or antioxidants.

The present invention also includes a process for coating a substrate which includes applying a film-forming primer composition having an ionic resin and a hindered amine light stabilizer to a substrate by electrodeposition and subsequently applying a film-forming topcoat composition to the primer composition. The hindered amine light stabilizer is preferably a hindered aminoether light stabilizer.

DETAILED DESCRIPTION OF THE INVENTION

The present primer composition addresses the problem of delamination of topcoats caused by photodegradation of epoxy-based primers by including in the primer composition a hindered amine light stabilizer (HALS) and particularly, a hindered aminoether light stabilizer. In this manner, topcoat quality variations in the ability to screen ultraviolet light are at least partially compensated for by the present invention. Therefore, the present primer composition is particularly well suited for use with a wide variety of topcoats.

The primary component of the electrodeposition primer composition of the present invention is a hindered amine light stabilizer, a preferred embodiment of which is a hindered aminoether light stabilizer. The hindered amine light stabilizer is included in the present composition in an amount sufficient to substantially reduce photodegradation of the composition and delamination of any subsequently applied topcoat as compared with the composition without the hindered amine light stabilizer. Typically, the hindered amine light stabilizer is present in the composition in amounts between about 0.1% and about 5%, more preferably between about 0.2% and about 3% and most preferably between about 0.5% and 2% based on total weight of resin solids. As is known, the ultraviolet region of sunlight (300 nanometers–400 nanometers) initiates free radicals in organic coatings which can cause degradation of the coating by several known or suggested mechanisms. The hindered amine light stabilizers of the present invention are a recognized class of compounds which act as free radical scavengers to reduce photodegradation of a composition by ultraviolet light, such as the class of compounds which are N-substituted 2,2,6,6-tetraalkylpiperidines. HALS include compounds having a group of the formula (I)

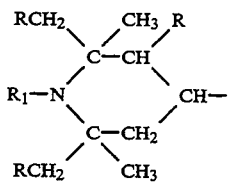

wherein R represents a hydrogen or methyl and $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_{18}$ alkanoyl or $C_3$–$C_5$ alkenoyl. Representative commercially available HALS are identified as TINUVIN 770, TINUVIN 292 and TINUVIN 440 and are sold by Ciba-Geigy Corporation.

A preferred class of HALS are hindered aminoether light stabilizers. Such compounds have a group of the formula (II)

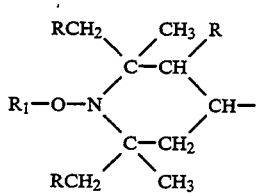

wherein $R_1$ and R are as discussed above. Hindered aminoether light stabilizers are believed to be particularly effective as HALS because no oxidation of the compound is required to make it an active radical trap as is necessary for non-aminoether type HALS. A representative commercially available hindered aminoether light stabilizer is identified as TINUVIN-123 and is sold by Ciba-Geigy Corporation. The aminoether of TINUVIN-123 is bis-(1-octyloxy-2,2,6,6-tetramethyl-4-piperidinyl) sebacate and has the formula (III)

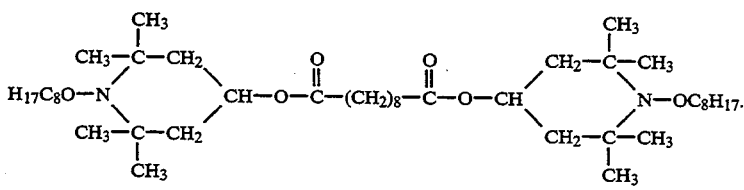

Without intending to be bound by theory, it is believed that hindered amine light stabilizers are particularly effective when the hindered amine light stabilizers are relatively non-volatile. In this manner, upon heating of the applied composition for cure and particularly in the event of overbake, a greater percentage of the HALS is likely to remain in the cured composition as compared to a more volatile HALS. For this reason, another preferred aspect of the invention is the use of a non-volatile HALS. As used herein, the term non-volatile generally refers to a HALS which has less than about a 5% weight loss after 30 minutes at 175° C., more preferably less than about a 4% weight loss and most preferably less than about a 3% weight loss.

In a further preferred embodiment of the invention, the HALS component has a pKb>7. In this manner, the HALS is particularly compatible with a subsequently applied topcoat when the topcoat includes an acid-catalyzed aminoplast crosslinker. Since such a HALS is a weak base, it will not inhibit the acid-catalyzed cure.

The ionic resin of the present composition can be any standard cationic or anionic resin commonly available to the art. Preferably, the present ionic resin is cationic. The cationic resins are typically acid-solubilized polyepoxides which are combined with a crosslinking agent.

The polyepoxides which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane or the like.

Besides polyhydric phenols, other cyclic polyols can be used in preparing the polyglycidyl ethers of cyclic polyol derivatives. Examples of other cyclic polyols would allcyclic polyols, particularly cycloaliphatic polyols, such as 1,2-cyclohexanediol, 1,4-cyclohexanediol, 1,2-bis-(hydroxymethyl)cyclohexane, 1,3-bis-(hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which increases rupture voltage of the composition and enhances flow and coalescence. Examples of polyether polyols and conditions for chain extension are disclosed in U.S. Pat. No. 4,468,307, column 2, line 67, to column 4, line 52, the portions of which are hereby incorporated by reference. Examples of polyester polyols for chain extension are disclosed in U.S. Pat. No. 4,148,772, column 4, line 42, to column 5, line 53, the portions of which are hereby incorporated by reference.

The polyepoxide is reacted with a cationic group former, for example, an amine and acid. The amine can be a primary, secondary or tertiary amine and mixtures of thereof.

The preferred amines are monoamines, particularly hydroxyl-containing amines. Although monoamines are preferred, polyamines such as ethylene diamine, diethylamine triamine, triethylene tetramine, N-(2-aminoethyl)ethanolamine and piperazine can be used but their use in large amounts is not preferred because they are multifunctional and have a greater tendency to gel the reaction mixture than monoamines.

Tertiary and secondary amines are preferred to primary amines because the primary amines are polyfunctional with regard to reaction with epoxy groups and have a greater tendency to gel the reaction mixture. When using polyamines or primary amines, special precautions should be taken to avoid gelation. For example, excess amine can be used and the excess can be vacuum stripped at the completion of the reaction. Also, the polyepoxide resin can be added to the amine to insure that excess amine will be present.

Examples of hydroxyl-containing amines are alkanolamines, dialkanolamines, trialkanolamines, alkylalkanolamines, arylalkanolamines and arylalkylalkanolamines containing from 2 to 18 carbon atoms in the alkanol, alkyl and aryl substituents. Specific examples include ethanolamine, N-methylethanolamine, diethanolamine, N-phenylethanolamine, N,N-dimethylethanolamine, N-methyldiethanolamine and triethanolamine.

Amines which do not contain hydroxyl groups such as mono, di and tri-alkyl amines and mixed alkyl-aryl amines and substituted amines in which the substituents are other than hydroxyl and in which the substituents do not detrimentally affect the epoxy-amine reaction can also be used. Specific examples of these amines are ethylamine, propylamine, methylethylamine, diethylamine, N,N-dimethylcyclohexylamine, triethylamine, N-benzyldimethylamine, dimethylcocamine and dimethyltallowamine. Also, amines such as hydrazine and propylene imine can be used. Ammonia can also be used and is considered for the purposes of this application to be an amine.

Mixtures of the various amines described above can be used. The reaction of the primary and/or secondary amine with the polyepoxide resin takes place upon mixing the amine with the product. The reaction can be conducted neat, or, optionally in the presence of a suitable solvent. Reaction may be exothermic and cooling may be desired. However, heating to a moderate temperature, that is, within the range of 50° to 150° C., may be used to hasten the reaction.

The reaction product of the primary or secondary amine with the polyepoxide resin attains its cationic character by at least partial neutralization with acid. A group of preferred acids which are used in preparing the electrocoating composition of the invention are sulfamic acid and derivatives thereof, this is, those acids of the structure:

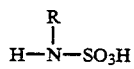

where R is H or $C_1$ to $C_4$ alkyl. Preferably, the acid is sulfamic acid itself. Hereafter, when "sulfamic acid" is used, not only sulfamic acid itself but also its derivatives as depicted by the above structure are intended. The use of sulfamic acid for neutralization is discussed in detail in U.S. Pat. No. 4,933,056 which is incorporated herein by reference. Examples of other suitable acids include organic and inorganic acids such as formic acid, acetic acid, lactic acid, phosphoric acid and carbonic acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

In the reaction of the tertiary amine with the polyepoxide resin, the tertiary amine can be prereacted with the acid such as those mentioned above to form the amine salt and the salt reacted with the polyepoxide to form the quaternary ammonium salt group-containing resin. The reaction is conducted by mixing the amine salt and the polyepoxide resin together in the presence of water. Typically, the water is employed on the basis of about 1.75 to about 20 percent by weight based on total reaction mixture solids.

Alternately, the tertiary amine can be reacted with the polyepoxide resin in the presence of water to form a quaternary ammonium hydroxide group-containing polymer which, if desired, may be subsequently acidified. The quaternary ammonium hydroxide-containing polymers can also be used without acid, although their use is not preferred.

In forming the quaternary ammonium base group-containing polymers, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary, although a solvent such as a sterically hindered ester, ether or sterically hindered ketone may be used if desired.

In addition to the primary, secondary and tertiary amines disclosed above, a portion of the amine which is reacted with the polyepoxide-polyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents which are described in more detail below.

Besides resins containing amine salts and quaternary ammonium base groups, resins containing other cationic groups can be used in the practice of this invention. Examples of other cationic resins are quaternary phosphonium resins and ternary sulfonium resins. However, resins containing amine salt groups and quaternary ammonium base groups are preferred and the amine salt group-containing resins are the most preferred.

The extent of cationic group formation of the resin should be selected so that when the resin is mixed with aqueous medium, a stable dispersion will form. A stable dispersion is one which does not settle or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

In general, most of the cationic resins prepared by the process of the invention contain from about 0.1 to 3.0, preferably from about 0.3 to 1.0 milliequivalents of cationic group per gram of resin solids.

The cationic resinous binders should preferably have weight average molecular weights, as determined by gel permeation chromatography using a polystyrene standard, of less than 100,000, more preferably less than 75,000 and most preferably less than 50,000 in order to achieve high flowability.

The preferred crosslinkers in the present composition are blocked isocyanates which are employed in the coating compositions of the invention and are organic polyisocyanates and can be those in which the isocyanato groups have been reacted with a compound so that the resultant blocked or capped isocyanate is stable to active hydrogens at room temperature but reactive with active hydrogens at elevated temperatures, usually between 90° and 200° C. Aromatic and aliphatic, including cycloaliphatic, polyisocyanates may be used and representative examples include diphenylmethane-4,4'-diisocyanate (MDI), 2,4- or 2,6-toluene diisocyanate including mixtures thereof (TDI), p-phenylene diisocyanate, tetramethylene and hexamethylene diisocyanates, dicyclohexylmethane-4,4'-diisocyanate, isophorone diisocyanate, mixtures of diphenylmethane-4,4'-diisocyanate and polymethylene polyphenylisocyanate. Higher polyisocyanates such as triisocyanates can be used. An example would include triphenylmethane-4,4',4"-triisocyanate. NCO-prepolymers such as reaction products of polyisocyanates with polyols such as neopentyl glycol and trimethylolpropane and with polymeric polyols such as polycaprolactone diols and triols (NCO/OH equivalent ratio greater than 1) can also be used. Preferred polyisocyanates are mixtures of diphenylmethane-4,4'-diisocyanate and polymethylene polyphenylisocyanates. Such mixtures are commonly referred to as crude MDI or polymeric MDI. A particularly preferred mixture is available from Mobay Chemical Co. as MONDUR MRS 2.

Some isocyanate crosslinkers are preferred from the standpoint of preventing delamination because, in the event of accidental extreme cure times and temperatures, i.e., overbake, they volatilize before thermally breaking down and causing delamination. Illustrative of such volatile polyisocyanates is TDI. In the case of non-volatile polyisocyanates, such as polymeric MDI, the potential for delamination can be reduced by limiting the amount of the polyisocyanate in the formulation as much as possible.

The blocked polyisocyanate can be used in two similar ways. The polyisocyanate can be fully blocked, that is, no free isocyanate groups remain and then added to the cationic polymer to form a two-component resin. Or, the polyisocyanate can be partially blocked, for example, half-blocked diisocyanate, so that there is one remaining reactive isocyanate group. The half-blocked isocyanate can then be reacted with active hydrogen groups in the polymer backbone under conditions which will not unblock the blocked isocyanate group. This reaction makes the isocyanate part of the polymer molecule and a one-component resin.

Whether fully blocked or partially blocked, sufficient polyisocyanate is present with the cationic polymer so that there are about 0.1 to about 1.2 isocyanate groups for each active hydrogen, i.e., hydroxyl, primary and secondary amino and thiol.

Preferably, the molecular weight of the crosslinker, measured as viscosity average molecular weight, is less than 40,000 in order to achieve high flowability.

The cationic resin and the blocked isocyanate are the principal resinous ingredients in the electrocoating compositions. They are usually present in amounts of about 50 to 100 percent by weight of resin solids.

Preferably, the electrodepositable coating compositions of the present invention are of the high film build type, that is, they are capable of being electrodeposited and cured as a substantially continuous thick film. By thick is meant a film having a dry film thickness of at least 25 and usually from about 25 to 75 microns. Preferably, the film will have a thickness of at least 30 and more preferably of at least 35 microns.

In a preferred embodiment of the present composition including an ionic resin and a hindered amine light stabilizer, the composition further includes a compound selected from the group consisting of ultraviolet light absorbers, antioxidants and mixtures thereof. Typically, such compounds are present in the composition in amounts of between about 0.05 weight percent and about 5 weight percent, and more preferably between about 0.1 weight percent and about 3 weight percent, and most preferably between about 0.1 weight percent and about 1.0 weight percent based on total weight of resin solids.

Ultraviolet light absorbers function by absorbing ultraviolet radiation and disposing of the energy without interacting with the polymers in the coating composition in any harmful way. Recognized classes of ultraviolet radiation absorbers include derivatives of 2-hydroxybenzophenone, 2-(2-H-benzotriazol-2-yl) phenols, phenyl esters and substituted cinnamic acid derivatives.

Antioxidants reduce or prevent photodegradation of polymers by retarding atmospheric oxidation of polymers in the coating composition. The present invention includes the use of commonly known antioxidants. A suitable commercial antioxidant is available from Ciba Geigy and is identified as Irganox 1010, which is a hindered phenol.

The electrodepositable composition of the present invention also usually contains a pigment which is incorporated into the composition in the form of a paste. The pigment paste is prepared by grinding or dispersing a pigment into a grinding vehicle and optional ingredients such as wetting agents, surfactants and defoamers. Grinding is usually accomplished by the use of ball mills, Cowles dissolvers, continuous attritors and the like until the pigment has been reduced to the desired size and has been wetted by and dispersed by the grinding vehicle. After grinding, the particle size of the pigment should be as small as practical, generally, a Hegman grinding gauge rating of about 6 to 8 is usually employed. Suitable pigment grinding vehicles can be selected from those known in the art.

Pigments which can be employed in the practice of the invention include titanium dioxide, basic lead silicate, carbon black, strontium chromate, iron oxide, clay and phthalocyanine blue. Pigments with high surface areas and oil absorbencies should be used judiciously because they can have an undesirable effect on coalescence and flow.

In addition to the above-described components, the present composition can also include various additives such as surfactants, wetting agents, catalysts, film build additives, and additives to enhance flow and appearance of the composition. Such additives are typically in the composition in amounts of about 0.01 to about 70 percent by weight based on total weight of resin solids.

The present invention is also directed to a process for coating a substrate which includes applying the electrodepositable film-forming primers, as broadly described above, to a substrate and subsequently applying a film-forming resin which transmits ultraviolet radiation, i.e. radiation having a wavelength less than about 400 nanometers, to the primer composition. Such a process is particularly useful because the primer reduces the effect of photodegradation caused by transmission of ultraviolet light through the topcoat.

In the electrodeposition process for applying the electro-depositable film-forming primer of the present invention, the primer is placed in contact with an electrically conductive anode and an electrically conductive cathode. If the ionic resin in the primer composition contains cationic groups, the surface to be coated is the cathode. If the ionic resin contains anionic groups, the surface to be coated is the anode. Upon passage of electric current between the anode and the cathode, while in contact with the bath containing the primer composition, an adherent film of the composition is deposited on the surface to be coated. In the present invention, the resin is preferably a cationic resin.

The conditions under which the electrodeposition is carried out are, in general, those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition. The method of the invention is applicable to the coating of any electrically conductive substrate, and especially metals such as steel, aluminum, copper and the like.

After deposition, the primer coating is cured at elevated temperatures by any convenient method such as in baking ovens or with banks of infrared heat lamps. Typically, cure is obtained at temperatures of about 200° F. to about 400° F.

After electrodeposition of the primer coating and either before or after cure of the primer, a subsequent topcoat is applied to the primed substrate. The topcoat is typically a pigmented composition and can be a single pigmented layer or a "color-plus-clear" two component system. The topcoat is then cured. Although a preferred embodiment of the present process includes the application of a topcoat over the primer, it should be noted that a composition in accordance with the present primer composition can be used as a single coat system and is believed to have improved durability.

An alternative to the above-described process is to coat a substrate with a standard electrodepositable primer which does not include a hindered amine light stabilizer and to subsequently apply a HALS to the electrocoated substrate. Application of a HALS can be accomplished by dipping or spraying the substrate in a solution of the HALS. This process further includes curing the electrocoated substrate after the additional HALS coating has been applied. Preferred embodiments of this process include the use of hindered aminoether light stabilizers as the HALS in the solution or the additional use of UV absorbers or antioxidants in the solution.

A HALS solution, in accord with the present invention, can be prepared with any suitable solvent at a concentration sufficient to obtain reduced photodegradation and improved delamination results. For example, suitable solvents include acetone, butoxyethanol, and xylene and the HALS can be present in amounts between about 0.1 volume percent and about 100 volume percent and more preferably between about 0.1 volume percent and about 10 volume percent based on total volume of the HALS solution.

As discussed above, the foregoing process is particularly useful when the topcoat does not adequately screen ultraviolet light which passes through the topcoat to impinge on the primer. Due to the hindered amine light stabilizer in the primer, photodegradation of the primer is significantly reduced or prevented.

The following examples are provided for the purpose of illustration of the present invention and are not intended to limit the scope of the invention, as claimed below.

EXAMPLE I

This example illustrates the use of application of a hindered amine light stabilizer to an electrocoated substrate.

A solution was prepared comprising 10% by volume TINUVIN 123 in acetone.

Smooth zinc-phosphated panels were electrocoated with 1.2 mils of ED4, an electrodepositable epoxy amine resin, with a polymeric MDI crosslinker, commercially available from PPG Industries, Inc. The panels were treated in three different ways:
A-Untreated
B-Dipped in 10% TINUVIN 123 in acetone, for 2 seconds, before baking
C-Dipped in 10% TINUVIN 123 in acetone, for 2 seconds, after baking The panels were cured at three different temperatures in a gas-fired oven.
1-30 minutes at 340° F.
2-30 minutes at 375° F.
3-30 minutes at 400° F.

Panels were subsequently topcoated with 1.8 mils of URC-6001, a melamine cured acrylic clearcoat with sufficient UV protection at 1.8 mils to provide 80% transmission of radiation at 400 nm wavelength, commercially available from PPG Industries, Inc., and baked for 30 minutes at 250° F. The topcoated panels were exposed in Florida (Fort Lauderdale) at 45° from horizontal facing south. After times to be specified, they were returned to the laboratory where they were cross-hatched with a tool having 6 teeth 2 mm. apart, rated for adhesion loss on a scale from 0=worst to 10=best, then placed in 100° F. at 100% relative humidity for 24 hours, then recross-hatched and rerated.

TABLE 1

| Electro-coat | Treatment | Bake | Time in Florida | Cross-Hatch Rating | |
|---|---|---|---|---|---|
| | | | | Initial | After Humidity |
| ED4 | A | 30' @ 340° F. | 5 weeks | 4 | 0 |
| ED4 | B | 30' @ 340° F. | 5 weeks | 10 | 0 |
| ED4 | C | 30' @ 340° F. | 5 weeks | 5 | 0 |
| ED4 | A | 30' @ 375° F. | 7 days | 0 | 0 |
| ED4 | B | 30' @ 375° F. | 7 days | 10 | 10 |
| ED4 | C | 30' @ 375° F. | 7 days | 4 | 0 |
| ED4 | A | 30' @ 400° F. | 7 days | 0 | 0 |
| ED4 | B | 30' @ 400° F. | 7 days | 10 | 10 |
| ED4 | C | 30' @ 400° F. | 7 days | 0 | 0 |

The results in Table 1 illustrate an improvement in adhesion of ED4 when subjected to rinsing with TINUVIN 123 before baking.

EXAMPLE II

This example compares the effect of applying various concentrations of TINUVIN 123 in acetone to an electrocoated substrate, before baking.

The following solutions were prepared:

A-Acetone only
B-10% TINUVIN 123 in acetone
C-1% TINUVIN 123 in acetone
D-0.1% TINUVIN 123 in acetone ED4 was electrocoated onto smooth, zinc-phosphated steel at 1.2 mils and subjected to the described dip-rinses for 2 seconds before being cured at the following temperatures:

1-30 minutes at 375° F. (gas oven)
2-30 minutes at 400° F. (gas oven)

Panels were subsequently topcoated with 1.8 mils of URC-6001 as described in Example 1, baked 30' @ 250° F., and exposed at 45° south in Fort Lauderdale for 7, 14 and 21 days.

TABLE 2

| Electro-coat | Dip Solution | Bake | Time in Florida | Cross-Hatch Adhesion Initial | After Humidity |
|---|---|---|---|---|---|
| ED4 | none | 30' @ 375° F. | 7 days | 10 | 10 |
| ED4 | A | 30' @ 375° F. | 7 days | 10 | 10 |
| ED4 | B | 30' @ 375° F. | 7 days | 10 | 10 |
| ED4 | C | 30' @ 375° F. | 7 days | 10 | 10 |
| ED4 | D | 30' @ 375° F. | 7 days | 10 | 8 |
| ED4 | none | 30' @ 375° F. | 14 days | 1 | 0 |
| ED4 | A | 30' @ 375° F. | 14 days | 9 | 0 |
| ED4 | B | 30' @ 375° F. | 14 days | 10 | 10 |
| ED4 | C | 30' @ 375° F. | 14 days | 10 | 10 |
| ED4 | D | 30' @ 375° F. | 14 days | 9 | 0 |
| ED4 | none | 30' @ 375° F. | 21 days | 0 | — |
| ED4 | B | 30' @ 375° F. | 21 days | 10 | 9 |
| ED4 | C | 30' @ 375° F. | 21 days | 10 | 2 |
| ED4 | none | 30' @ 400° F. | 7 days | 0 | — |
| ED4 | A | 30' @ 400° F. | 7 days | 7 | 0 |
| ED4 | B | 30' @ 400° F. | 7 days | 10 | 10 |
| ED4 | C | 30' @ 400° F. | 7 days | 10 | 2 |
| ED4 | D | 30' @ 400° F. | 7 days | 7 | 0 |
| ED4 | none | 30' @ 400° F. | 14 days | 0 | — |
| ED4 | A | 30' @ 400° F. | 14 days | 0 | |
| ED4 | B | 30' @ 400° F. | 14 days | 10 | 10 |
| ED4 | D | 30' @ 400° F. | 14 days | 7 | 0 |

The results in Table 2 illustrate that improved adhesion results are obtained at higher concentrations of TINUVIN 123.

EXAMPLE III

The following example compares applying TINUVIN 123 to electrocoated substrates with applying TINUVIN 292, a normal hindered amine light stabilizer (NH terminated) of high basicity.

Solutions were prepared as follows:

A-10% TINUVIN 292 in acetone (to compare to previous example)
B-1% TINUVIN 292 in 2-butoxyethanol
C-1% TINUVIN 123 in 2-butoxyethanol Smooth zinc-phosphated steel panels were electrocoated with 1.2 mils ED4, subjected to 2 second dips in the described solutions, and compared for delamination resistance at the following bakes:

1-30 minutes at 375° F. (gas oven)
2-30 minutes at 400° F. (gas oven)

Panels were topcoated with 1.8 mils URC-6001 as described in Example 1, baked 30' @ 250° F., and exposed at 45° south in Fort Lauderdale for 7 days.

TABLE 3

| Electro-coat | Dip Solution | Bake | Time in Florida | Cross-Hatch Adhesion Initial | After Humidity |
|---|---|---|---|---|---|
| ED4 | none | 30' @ 375° F. | 7 days | 7 | 0 |
| ED4 | A | 30' @ 375° F. | 7 days | 10 | 10 |
| ED4 | B | 30' @ 375° F. | 7 days | 10 | 4 |
| ED4 | C | 30' @ 375° F. | 7 days | 10 | 10 |
| ED4 | none | 30' @ 400° F. | 7 days | 2 | 0 |
| ED4 | A | 30' @ 400° F. | 7 days | 10 | 4 |
| ED4 | B | 30' @ 400° F. | 7 days | 4 | 0 |
| ED4 | C | 30' @ 400° F. | 7 days | 10 | 10 |

The results in Table 3 illustrate that use of a hindered aminoether light stabilizer (TINUVIN 123) provides better adhesion results than a standard HALS (TINUVIN 292).

EXAMPLE IV

This example illustrates the effect of incorporating a hindered amine light stabilizer into an electrocoat composition. This embodiment is compared at different concentrations of HALS, and with two different means of incorporation.

Preparation Of Film-Forming Resin 4A

Film-forming resin 4A was prepared from the following mixture of ingredients:

| Ingredients | Parts by Weight |
|---|---|
| EPON 828 | 1023.0 |
| Bisphenol A-ethylene oxide adduct (1/6 molar ratio) | 365.0 |
| Bisphenol A | 297.0 |
| Methyl isobutyl ketone | 88.7 |
| Benzyldimethylamine | 1.4 |
| Benzyldimethylamine | 4.2 |
| Crosslinker[1] | 1783.9 |
| Diketimine[2] | 115.6 |
| N-methylethanolamine | 98.6 |
| 88% lactic acid | 110.1 |
| Surfactants | 51.6 |
| Deionized Water | 2252.7 |
| Deionized Water | 1360.4 |
| Deionized Water | 2137.7 |

[1]The capped polyisocyanate crosslinker was prepared from the following mixture of ingredients:

| Ingredients | Parts by Weight |
|---|---|
| Polyisocyanate[a] | 4095.0 |
| Methyl isobutyl ketone | 2199.6 |
| Dibutyltin dilaurate | 6.2 |
| 2-(2-Butoxyethoxy)ethanol | 3353.0 |
| Trimethylolpropane | 356.1 |
| 2-(2-Butoxyethoxy)ethanol | 464.2 |

[a]Polymeric MDI available from Mobay Chemical Company as MONDUR MRS-4.

The polyisocyanate, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60 and 65° C. Upon completion of the addition the reaction mixture was held at 65° C. for 90 minutes. The trimethylolpropane was then added and the mixture heated to 110° C. and held for three hours whereupon the final portion of the 2-(2-butoxyethoxy)ethanol was added. The 110° C. hold was continued until infrared analysis indicated no unreacted NCO.

[2]Diketimine derived from diethylene triamine and methyl isobutyl ketone, 72% solids in methyl isobutyl ketone.

[3]Surfactant prepared from 
51.5 Glacial acetic acid
316.17 2-butoxyethanol
316.17 Surfynol 104 acetylenic diol from Air Products & Chemicals Inc.

| Ingredients | Parts by Weight | |
|---|---|---|
| | 316.17 | Geigy Amine C alkyl imidazoline, Ciba-Geigy Corp. |
| | 1000.0 | |

The EPON 828, bisphenol A-ethylene oxide adduct, bisphenol A and methyl isobutyl ketone were charged into a reaction vessel and heated under a nitrogen atmosphere to 140° C. The first portion of the benzyldimethylamine was added and the reaction mixture allowed to exotherm to about 185° C. and refluxed to azeotropically remove any water present. The reaction mixture was cooled to 160° C., held for one half hour, cooled further to 145° C. and the second portion of benzyldimethylamine added. The reaction was held at 145° C. until a reduced Gardner-Holdt viscosity (50 percent resin solids in 2-methoxypropanol) of P-Q was obtained. At this point, the crosslinker, the diketimine and N-methylethanolamine were added in succession. The mixture was allowed to exotherm and then a temperature of 125° C. was established. After one hour at 125° C., the resin was dispersed in aqueous medium by adding it to a mixture of the lactic acid, surfactant and the first portion of deionized water. The dispersion was further thinned in stages with the second and third portions of deionized water and vacuum strippped to remove organic solvent to give a dispersion having a solids content of 36.0 percent and a particle size of 825 Å.

Preparation of Modifying Resin 4B

Modifying Resin 4B is a polyepoxidepolyoxyalkylenediamine adduct for subsequent addition to a cationic electrodeposition bath to provide better appearance in the cured coating. In order to prepare the adduct, an intermediate polyepoxide was prepared from the following mixture of ingredients:

| Ingredients | Parts by Weight |
|---|---|
| EPON 828 | 1000.0 |
| Bisphenol A | 308.1 |
| Ethyltriphenyl phosphonium iodide | 1.3 |
| 2-Butoxyethanol | 413.5 |

The EPON 828 and bisphenol A were charged to a reaction vessel under a nitrogen blanket and heated to 110° C. The reaction mixture was held at 110° C. until all the bisphenol A had dissolved whereupon the ethyltriphenyl phosphonium iodide catalyst was added and the reaction mixture was heated to 160° C. to initiate reaction. The mixture was allowed to exotherm to 180° C. and then cooled to 160° C. where it was held for an hour to complete reaction. When the hold was over, the 2-butoxyethanol was added to give a solids content of 76 percent and an epoxy equivalent weight of 504 (based on solids).

The adduct was then prepared from the following mixture of ingredients:

| Ingredients | Parts by Weight |
|---|---|
| JEFFAMINE D-2000 | 2362.2 |
| Polyepoxide intermediate prepared as described above | 1141.6 |

| Ingredients | Parts by Weight |
|---|---|
| 2-Butoxyethanol | 296.1 |
| 88% Aqueous tactic acid solution | 96.6 |
| Deionized Water | 5279.1 |

A polyoxypropylenediamine having a molecular weight of 2000 and commercially available from Texaco Chemical Company as JEFFAMINE D-2000 was reacted with the polyepoxide intermediate as follows: The JEFFAMINE D-2000 was charged to a reaction vessel under a nitrogen atmosphere and heated to 90° C. The polyepoxide intermediate and the butoxyethanol were added over a one half hour period. At the completion of the addition, the reaction mixture was heated to 130° C. and held there for three hours. The resin was then dispersed by pouring it into a mixture of the 88% aqueous lactic acid solution and deionized water. The resulting reaction product had a solids content of 36.0 percent.

Main Film Forming Resin 4C Incorporating Tinuvin 123

A main film-forming resin 4C containing Tinuvin 123 was prepared from the following mixture of ingredients:

| Ingredients | Parts by Weight |
|---|---|
| EPON 828 | 1019.25 |
| Bisphenol A-ethyleneoxide 1/6 | 366.08 |
| Bisphenol A | 297.45 |
| Methyl isobutyl ketone | 88.65 |
| Benzyl dimethyl amine | 1.44 |
| Benzyl dimethyl amine | 4.28 |
| Crosslinker[1] | 1779.19 |
| Diketimine[2] | 112.28 |
| Methyl ethanolamine | 98.42 |
| Tinuvin 123 | 101.04 |
| Sulfamic acid | 92.99 |
| Deionized Water | 2167.23 |
| Deionized Water | 1359.95 |
| Deionized Water | 2137.07 |

[1] Crosslinker as described in resin 4A
[2] Diketimine as described in resin 4A The EPON 828, bisphenol A-ethyleneoxide adduct, bisphenol A, and methylisobutyl ketone were charged into a reaction vessel and heated under a nitrogen atmosphere to 140° C. The first portion of the benzyldimethylamine was added and the reaction allowed to exotherm with azeotropic removal of water, then cooled to 160° C and held for one half hour. The reaction mixture was then cooled to 145° C. and the second portion of benzyldimethylamine added. The reaction was held until a reduced Gardner-Holdt viscosity (50% solids in 2-methoxypropanol) of P+ was attained at which point the crosslinker, diketimine, and methylethanolamine were added in succession. The reaction was then completed during a hold of 1 hour at 125° C. The Tinuvin 123 was then added to the reaction mixture, and the entire mixture was then partially dispersed by pouring it into an agitated mixture of sulfamic acid and the first portion of deionized water. The dispersion was further thinned in stages with the second and third portions of deionized water and vacuum stripped to remove organic solvent, yielding a final dispersion of 39.8% solids and 963 Å particle size.

Modifying Resins 4D-1 and 4D-2 Incorporating Tinuvin 123

A modifying resin 4D-1 was prepared from the following ingredients:

| Ingredients | Parts by Weight |
| --- | --- |
| JEFFAMINE D-2000 | 2159.3 |
| Polyepoxide intermediate prepared as in Resin 4B, 75% solids | 1093.4 |
| 2-Butoxyethanol | 254.8 |

The polyoxypropylenediamine was charged to a reaction vessel under a nitrogen atmosphere and heated to 90° C. 1051.4 parts of the polyepoxide intermediate were added, the mixture was heated and held at 130° C. for 3 hours and 40 minutes, and 22 parts more epoxide intermediate was added. After 4 more hours at 130° C., the butoxyethanol and 20 parts more epoxide intermediate were added, and after 3 hours and 15 minutes longer at 130° C. the desired Gardner-Holdt viscosity of Z at 50% solids in 2-methoxy propanol was achieved. The resulting cooled product 4D-1 had a solids content of 86.7%.

A solubilized mixture of the above adduct and Tinuvin 123 was designated 4D-2 and prepared as follows.

| | |
| --- | --- |
| Adduct 4D-1 | 500.0 |
| Tinuvin 123 | 144.5 |
| 88% Lactic Acid | 34.1 |
| Deionized Water | 972.8 |

The first three ingredients were mixed well, before adding the deionized water slowly under strong agitation. The solids content of the dispersion 4D-2 was 35%.

Electrocoating composition 4E was prepared as follows.

| Ingredients | Parts by Weight |
| --- | --- |
| Resin 4B | 296 |
| Paraplex WP1[1] | 72 |
| Deionized Water | 130 |
| (Mix well for 30 minutes) | |
| Resin 4A | 2836 |
| Deionized Water | 3890 |
| E5994 Paste[2] | 776 |

[1]Plasticizer available from Rohm and Haas
[2]Available from PPG Industries as a milled dispersion of titanium dioxide (46.2 weight percent of pigment paste), carbon black (1.5 weight percent of pigment paste) basic lead silicate (3.4 weight percent of pigment paste), and dibutyltin oxide (2.6 weight percent of pigment paste)

Electrocoating composition 4F, containing 2.1% Tinuvin 123 on resin solids dispersed in modifying resin, was prepared as follows.

| Ingredients | Parts by Weight |
| --- | --- |
| Resin 4D-2 | 304 |
| Paraplex WP1 | 72 |
| Deionized Water | 130 |
| (Mix well for 30 minutes) | |
| Resin 4A | 2836 |
| Deionized Water | 3882 |
| E5994 Paste | 776 |

Electrocoating composition 4G, containing 2.6% Tinuvtn 123 on resin solids dispersed in the main film-forming resin, was prepared as follows.

| Ingredients | Parts by Weight |
| --- | --- |
| Resin 4B | 296 |
| Paraplex WP1 | 72 |
| Deionized Water | 130 |
| (Mix well for 30 minutes) | |
| Resin 4C | 2566 |
| Deionized Water | 4160 |
| E5994 Paste | 776 |

Electrocoating compositions 4H, 4I, 4J, 4K, 4L, and 4M were prepared by blending 4E, 4F and 4G as follows.

| Composition | Parts 4E | Parts 4F | Parts 4G |
| --- | --- | --- | --- |
| 4H | 1700 | 1700 | 0 |
| 4I | 2550 | 850 | 0 |
| 4J | 3060 | 340 | 0 |
| 4K | 2093 | 0 | 1307 |
| 4L | 2747 | 0 | 653 |
| 4M | 3139 | 0 | 261 |

The makeup of electrocoat compositions 4E-M in terms of % Tinuvin 123 and method of incorporation of Tinuvin 123 is summarized below.

| Composition | % Tinuvin 123 On Resin Solids | Incorporation Method of Tinuvin 123 |
| --- | --- | --- |
| 4E | 0 | None |
| 4F | 2.1 | Modifying Resin |
| 4H | 1.0 | Modifying Resin |
| 4I | 0.5 | Modifying Resin |
| 4J | 0.2 | Modifying Resin |
| 4G | 2.6 | Main Film-Forming Resin |
| 4K | 1.0 | Main Film-Forming Resin |
| 4L | 0.5 | Main Film-Forming Resin |
| 4M | 0.2 | Main Film-Forming Resin |

Smooth zinc-phosphated steel panels were electrocoated with the above compositions under conditions to produce 1.2 mils baked film. They were baked at the following conditions:

1. 30 minutes at 375° F. (gas oven).
2. 30 minutes at 400° F. (gas oven).

A portion of the panels were topcoated with 1.8 mils URC-6001 as described in Example 1, and baked 30 minutes at 250° F. These panels were exposed in Florida at 45° South, for one, two, and three weeks, then returned for adhesion evaluations.

Another portion of panels was topcoated with 0.35 mils of a basecoat which is a 50/50 blend of HBAL-9264 (melamine-cured acrylic blue basecoat available from PPG Industries) and E5697 (melamine cured acrylic clearcoat available from PPG Industries, Inc.), plus 1.8 mils of E5697 clearcoat. The above system was designed to have 20% transmission of radiation at 400 nanometers when cured 30 minutes at 250° F. Panels were exposed for 2, 4, 6, 8, and 10 weeks at 5° South, then reviewed for topcoat adhesion ratings as described in Example I. The results are shown below in Table 4.1 and 4.2.

TABLE 4.1

| Electrocoat | Topcoat | Bake | Time in Fla. | Crosshatch Adhesion Initial | Crosshatch Adhesion After Humidity |
|---|---|---|---|---|---|
| 4E | URC-6001 | 30' @ 375 | 1 week | 10 | 0 |
| 4F | URC-6001 | 30' @ 375 | 1 week | 10 | 10 |
| 4H | URC-6001 | 30' @ 375 | 1 week | 10 | 9 |
| 4I | URC-6001 | 30' @ 375 | 1 week | 10 | 10 |
| 4J | URC-6001 | 30' @ 375 | 1 week | 9 | 1 |
| 4G | URC-6001 | 30' @ 375 | 1 week | 10 | 9 |
| 4K | URC-6001 | 30' @ 375 | 1 week | 10 | 10 |
| 4L | URC-6001 | 30' @ 375 | 1 week | 10 | 1 |
| 4M | URC-6001 | 30' @ 375 | 1 week | 9 | 2 |
| 4E | URC-6001 | 30' @ 400 | 1 week | 8 | 0 |
| 4F | URC-6001 | 30' @ 400 | 1 week | 10 | 10 |
| 4H | URC-6001 | 30' @ 400 | 1 week | 9 | 2 |
| 4I | URC-6001 | 30' @ 400 | 1 week | 10 | 1 |
| 4J | URC-6001 | 30' @ 400 | 1 week | 8 | 0 |
| 4G | URC-6001 | 30' @ 400 | 1 week | 10 | 10 |
| 4K | URC-6001 | 30' @ 400 | 1 week | 10 | 10 |
| 4L | URC-6001 | 30' @ 400 | 1 week | 9 | 0 |
| 4M | URC-6001 | 30' @ 400 | 1 week | 8 | 1 |
| 4E | URC-6001 | 30' @ 375 | 2 weeks | 7 | 0 |
| 4F | URC-6001 | 30' @ 375 | 2 weeks | 10 | 10 |
| 4H | URC-6001 | 30' @ 375 | 2 weeks | 10 | 0 |
| 4I | URC-6001 | 30' @ 375 | 2 weeks | 6 | 0 |
| 4J | URC-6001 | 30' @ 375 | 2 weeks | 2 | 0 |
| 4G | URC-6001 | 30' @ 375 | 2 weeks | 10 | 10 |
| 4K | URC-6001 | 30' @ 375 | 2 weeks | 10 | 10 |
| 4L | URC-6001 | 30' @ 375 | 2 weeks | 9 | 0 |
| 4M | URC-6001 | 30' @ 375 | 2 weeks | 8 | 1 |
| 4E | URC-6001 | 30' @ 400 | 2 weeks | 1 | 0 |
| 4F | URC-6001 | 30' @ 400 | 2 weeks | 10 | 7 |
| 4H | URC-6001 | 30' @ 400 | 2 weeks | 4 | 0 |
| 4I | URC-6001 | 30' @ 400 | 2 weeks | 5 | 0 |
| 4J | URC-6001 | 30' @ 400 | 2 weeks | 2 | 0 |
| 4G | URC-6001 | 30' @ 400 | 2 weeks | 9 | 1 |
| 4K | URC-6001 | 30' @ 400 | 2 weeks | 8 | 0 |
| 4L | URC-6001 | 30' @ 400 | 2 weeks | 1 | 0 |
| 4M | URC-6001 | 30' @ 400 | 2 weeks | 1 | 0 |
| 4F | URC-6001 | 30' @ 375 | 3 weeks | 10 | 10 |
| 4H | URC-6001 | 30' @ 375 | 3 weeks | 9 | 0 |
| 4G | URC-6001 | 30' @ 375 | 3 weeks | 10 | 10 |
| 4K | URC-6001 | 30' @ 375 | 3 weeks | 9 | 0 |

TABLE 4.2

| Electrocoat | Topcoat | Bake | 2 Weeks Init. | 2 Weeks +HUM. | 4 Weeks Init. | 4 Weeks +HUM. | 6 Weeks Init. | 6 Weeks +HUM. | 8 Weeks Init. | 8 Weeks +HUM. | 10 Weeks Init. | 10 Weeks +HUM. |
|---|---|---|---|---|---|---|---|---|---|---|---|---|
| 4E | 50/50 HBAL 9264/E5697 and E5697 | 30' @ 375 | 9 | 9 | 9 | 9 | 9 | 8 | 9 | 4 | 9 | 0 |
| 4F | 50/50 HBAL 9264/E5697 and E5697 | 30' @ 375 | 9 | 9 | 9 | 9 | 9 | 9 | 9 | 9 | 9 | 8 |
| 4H | 50/50 HBAL 9264/E5697 and E5697 | 30' @ 375 | 9 | 9 | 9 | 9 | 9 | 9 | 9 | 9 | 9 | 2 |
| 4I | 50/50 HBAL 9264/E5697 and E5697 | 30' @ 375 | 9 | 9 | 9 | 9 | 9 | 8 | 9 | 0 | 9 | 0 |
| 4J | 50/50 HBAL 9264/E5697 and E5697 | 30' @ 375 | 9 | 9 | 9 | 9 | 9 | 6 | 9 | 0 | 9 | 0 |
| 4G | 50/50 HBAL 9264/E5697 and E5697 | 30' @ 375 | 9 | 9 | 9 | 9 | 9 | 9 | 9 | 9 | 9 | 8 |
| 4K | 50/50 HBAL 9264/E5697 and E5697 | 30' @ 375 | 9 | 10 | 9 | 10 | 9 | 9 | 9 | 9 | 9 | 1 |
| 4L | 50/50 HBAL 9264/E5697 and E5697 | 30' @ 375 | 9 | 9 | 9 | 9 | 9 | 8 | 9 | 2 | 9 | 0 |
| 4M | 50/50 HBAL 9264/E5697 and E5697 | 30' @ 375 | 9 | 9 | 9 | 8 | 9 | 1 | 9 | 0 | 9 | 0 |
| 4E | 50/50 HBAL 9264/E5697 and E5697 | 30' @ 400 | 9 | 9 | 9 | 8 | 9 | 0 | 9 | 0 | 8 | 0 |
| 4F | 50/50 HBAL 9264/E5697 and E5697 | 30' @ 400 | 9 | 10 | 9 | 10 | 9 | 9 | 9 | 7 | 9 | 0 |
| 4H | 50/50 HBAL 9264/E5697 and E5697 | 30' @ 400 | 9 | 9 | 9 | 9 | 9 | 9 | 9 | 7 | 9 | 1 |
| 4I | 50/50 HBAL | 30' @ 400 | 9 | 9 | 9 | 9 | 9 | 8 | 8 | 0 | 8 | 0 |

TABLE 4.2-continued

| Electrocoat | Topcoat | Bake | Time in Florida/Crosshatch Adhesion | | | | | | | | | |
|---|---|---|---|---|---|---|---|---|---|---|---|---|
| | | | 2 Weeks | | 4 Weeks | | 6 Weeks | | 8 Weeks | | 10 Weeks | |
| | | | Init. | +HUM. | Init. | +HUM. | Init. | +HUM. | Init. | +HUM. | Init. | +HUM. |
| 4J | 9264/E5697 and E5697 50/50 HBAL | 30' @ 400 | 9 | 10 | 9 | 9 | 9 | 2 | 9 | 0 | 9 | 0 |
| 4G | 9264/E5697 and E5697 50/50 HBAL | 30' @ 400 | 9 | 10 | 9 | 9 | 9 | 9 | 9 | 8 | 9 | 0 |
| 4K | 9264/E5697 and E5697 50/50 HBAL | 30' @ 400 | 9 | 10 | 9 | 10 | 9 | 8 | 9 | 4 | 9 | 0 |
| 4L | 9264/E5697 and E5697 50/50 HBAL | 30' @ 400 | 9 | 9 | 9 | 9 | 9 | 5 | 9 | 0 | 9 | 0 |
| 4M | 9264/E5697 and E5697 50/50 HBAL | 30' @ 400 | 9 | 9 | 9 | 8 | 9 | 0 | 9 | 0 | 9 | 0 |

The results in Tables 4.1 and 4.2 illustrate the effectiveness in crosshatch adhesion of incorporating Tinuvin 123 into resin compositions.

EXAMPLE V

This example illustrates the effect of combining Tinuvin 123 with an antioxidant.

ADDITIVE DISPERSION 5A

| | |
|---|---|
| Unsolubilized Modifying Resin 4D-1 of Example IV at 86.7% Solids | 116.6 |
| 88% Lactic Acid | 7.9 |
| Deionized Water | 271.4 |
| Irganox 1010[1] | 240.0 |

The above dispersion was milled to a 7+ Hegman reading on a laboratory sand mill.

[1] A hindered phenolic antioxidant compound available from Ciba-Geigy Corporation.

RESIN DISPERSION 5B

| | |
|---|---|
| Paraplex WP1 | 62 |
| Tinuvin 123 | 25 |
| (Mix, Dissolve) | |
| Resin 4B | 316 |
| (Mix well for 30 minutes) | |
| Resin 4A | 2554 |
| Deionized Water | 543 |
| (Mix well) | |

RESIN DISPERSION 5C

| | |
|---|---|
| Resin 4B | 316 |
| Deionized Water | 125 |
| Paraplex WP1 | 62 |
| (Mix well for 30 minutes) | |
| Resin 4A | 2554 |
| Deionized Water | 443 |
| (Mix well) | |

ELECTROCOAT COMPOSITIONS 5D, 5E, 5F, 5G

| Composition | 5D | 5E | 5F | 5G |
|---|---|---|---|---|
| Resin Dispersion 5C | 1682 | 0 | 841 | 841 |
| Resin Dispersion 5B | 0 | 1682 | 841 | 841 |
| Deionized Water | 1931 | 1931 | 1931 | 1929 |
| E5994 Paste | 387 | 387 | 387 | 387 |
| Additive Dispersion 5A | 0 | 0 | 0 | 2 |

The four prepared electrocoats have the following contents of Tinuvin 123 and Irganox 1010:

| Composition | % Tinuvin 123 on Resin Solids | % IRGANOX 1010 on Resin Solids |
|---|---|---|
| 5D | 0 | 0 |
| 5E | 2.0 | 0 |
| 5F | 1.0 | 0 |
| 5G | 1.0 | 0.1 |

The above compositions were electrocoated onto smooth zinc phosphated steel under conditions producing 1.2 mils baked film. They were baked 30 minutes at 375° F. in a gas oven.

The panels were topcoated with 1.8 mils URC-6001 (80% transmission at 400 nanometers) clearcoat, baked 30 minutes at 250° F., and exposed in Florida at 5° South for 4, 8, 12, 16 and 20 days. They were subsequently evaluated for topcoat adhesion as described in Example I. The results are shown in Table 5:

TABLE 5

| Electrocoat | Topcoat | Bake | Time in Florida/Crosshatch Adhesion | | | | | | | | | |
|---|---|---|---|---|---|---|---|---|---|---|---|---|
| | | | 4 Days | | 8 Days | | 12 Days | | 16 Days | | 20 Days | |
| | | | Init. | +HUM. | Init. | +HUM. | Init. | +HUM. | Init. | +HUM. | Init. | +HUM. |
| 5D | URC-6001 | 30' @ 375° F. | 10 | 10 | 4 | 0 | 0 | 0 | 0 | 0 | 0 | 0 |
| 5E | URC-6001 | 30' @ 375° F. | 10 | 10 | 10 | 10 | 9 | 8 | 9 | 0 | 9 | 0 |
| 5F | URC-6001 | 30' @ 375° F. | 10 | 10 | 9 | 8 | 8 | 0 | 1 | 0 | 1 | 0 |

TABLE 5-continued

| Electro-coat | Topcoat | Bake | Time in Florida/Crosshatch Adhesion | | | | | | | | | |
|---|---|---|---|---|---|---|---|---|---|---|---|---|
| | | | 4 Days | | 8 Days | | 12 Days | | 16 Days | | 20 Days | |
| | | | Init. | +HUM. | Init. | +HUM. | Init. | +HUM. | Init. | +HUM. | Init. | +HUM. |
| 5G | URC-6001 | 30' @ 375° F. | 10 | 10 | 10 | 10 | 10 | 0 | 10 | 0 | 9 | 0 |

EXAMPLE VI

This example illustrates a preferred way to incorporate both Tinuvin 123 and Irganox 1010 into an electrocoat bath at 1.0% and 0.1% of resin solids respectively. The formulation is further optimized for delamination in that it contains a relatively low level of titanium dioxide and employs a toluene diisocyanate (TDI) as opposed to a polymethylene polyphenyl isocyanate (polymeric MDI) based crosslinker.

Main Film-Forming Resin 6A

The cationic resin is prepared from the following mixture of ingredients:

| Ingredients | Parts by Weight (grams) |
|---|---|
| EPON 828[1] | 524.0 |
| Bisphenol A-ethylene oxide adduct (1/6 molar ratio) | 189.0 |
| Xylene | 46.0 |
| Bisphenol A | 152.0 |
| Benzyldimethylamine (catalyst) | 0.39 |
| Benzyldimethylamine | 0.97 |
| Crosslinker[2] | 694 |
| Diketimine[3] | 59.0 |
| N-methylethanolamine | 50 |
| DOWANOL PPH[4] | 43 |
| 88% Aqueous lactic acid | 47.5 |
| Deionized Water | 2457 |

[1]Epoxy resin solution made from reacting epichlorohydrin and bisphenol A having an epoxy equivalent of about 188, commercially available from Shell Chemical Company.
[2]The crosslinker which was formed from half-capping toluene diisocyanate (80/20 2,4/2,6-isomer mixture) with 2-hexoxyethanol and reacting this product with trimethylolpropane in a 3:1 molar ratio. The crosslinker was present as a 70 percent solids solution in methyl isobutyl ketone and butanol (9:1 weight ratio).
[3]Diketimine derived from diethylenetriamine and methyl isobutyl ketone (73% solids in methyl isobutyl ketone).
[4]1-Phenoxy-2-propanol from Dow Chemical Co.

The EPON 828, bisphenol A-ethylene oxide adduct, bisphenol A, and methyl isobutyl ketone are charged to a reaction vessel and heated together under a nitrogen atmosphere at 140° C. The first portion of benzyldimethylamine is added and the reaction mixture allowed to exotherm to 183° C. and refluxed under reduced pressure to azeotropically remove any water present. The reaction mixture is cooled to 160° C., held for one-half hour, cooled further to 145° C. and the second portion of benzyldimethylamine is added. The reaction mixture is held at 145° C. for two hours at which time a reduced Gardner-Holdt viscosity (50 percent resin solids in 2-methoxypropanol) of Q-R is obtained. The polyurethane crosslinker, diketimine derivative, and N-methylethanolamine are added and the temperature of the reaction mixture brought to 118° C. and held at this temperature for 1.5 hours. The DOWANOL PPH is added and the reaction mixture is dispersed in a mixture of the lactic acid and the first portion of deionized water. Further portions of the water are gradually added to bring the resin solids to 33 percent. Stripping in vacuum to remove organic solvent gives a dispersion having a solids content of 36.0 percent. The crosslinker comprises about 35 percent of the resin solids.

| Modifying Resin 6B Containing Tinuvin 123 and Irganox 1010 | |
|---|---|
| Ingredients | Parts by Weight |
| Jeffamine D2000 | 2380.0 |
| Polyepoxide Intermediate Prepared As In Example IV, Resin 4B, at 75% Solids | 1267.0 |
| 2-Butoxyethanol | 273.0 |
| Tinuvin 123 | 827.1 |
| Irganox 1010 | 83.0 |
| Glacial Acetic Acid | 25.5 |
| Deionized Water | 1273.0 |
| Deionized Water | 333.3 |

The polyoxypropylene diamine is charged to a reaction vessel under a nitrogen atmosphere and heated to 90° C. 1188.3 parts of the polyepoxide intermediate are added, plus the 2-butoxyethanol, and the mixture is heated to 130° C. and held for 3 hours and 20 min. 24.5 parts polyepoxide intermediate is added and the mixture held for one hour and 40 minutes. 54.2 parts polyepoxide intermediate is added, and the reaction mixture held for one hour and 15 minutes more to attain a desired Gardner-Holdt viscosity at 50% solids in 2-methoxypropanol of Y+. The mixture is cooled to 115° C. and the Tinuvin 123 and Irganox 1010 are added and stirred until the Irganox 1010 is dissolved. The resin is then dispersed by pouring into an agitated mixture of acetic acid and the first portion of deionized water. After thorough mixing, the second portion of deionized water is added and thoroughly mixed. The resulting resin dispersion has a solids content of 35.8%.

| Electrocoat Composition 6C | |
|---|---|
| Ingredients | Parts by Weight |
| Resin 4B | 88.9 |
| Modifying Resin 6B | 89.4 |
| Paraplex WP1 | 38.4 |
| Deionized Water | 75.9 |
| (Mix Well for 30 Minutes) | |
| Main Film-Forming Resin 6A | 1492.2 |
| Deionized Water | 1508.0 |
| E6064 Paste[1] | 207.2 |

[1]A paste commercially available from PPG containing 27.2% titanium dioxide, 1.4% carbon black, 15.9% aluminum silicate, 5.7% basic lead silicate, and 3.8% dibutyl tin oxide.

What is claimed is:

1. An electrodepositable film-forming primer composition, comprising:
   (a) an aqueous dispersion of a cationic epoxy-based resin; and
   (b) a hindered aminoether light stabilizer which has a group of the formula:

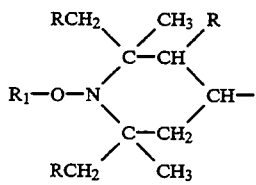

wherein R represents a hydrogen or methyl and $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_{18}$ alkanoyl or $C_3$–$C_5$ alkenoyl; present in an effective amount to stabilize the electrodepositable film-forming primer composition against ultraviolet radiation.

2. A composition, as claimed in claim 1, wherein $R_1 = C_8$ alkyl.

3. A composition, as claimed in claim 1, wherein said hindered aminoether light stabilizer is bis-(1-octyloxy-2,2,6,6-tetramethyl-4-piperidinyl) sebacate.

4. A composition, as claimed in claim 1, wherein said hindered aminoether light stabilizer is present in an amount of between about 0.1% and about 5% based on total weight of resin solids.

5. A composition, as claimed in claim 1, further comprising a blocked isocyanate crosslinker.

6. A composition, as claimed in claim 5, wherein said blocked isocyanate is a blocked mixture of diphenylmethane-4,4'-diisocyanate and polymethylene polyphenylisocyanate.

7. A composition, as claimed in claim 5, wherein said blocked isocyanate is blocked toluene diisocyanate.

8. A composition, as claimed in claim 1, further comprising a compound selected from the group consisting of ultraviolet light absorbers, antioxidants, and mixtures thereof.

* * * * *